Nov. 17, 1964     J. C. MILLER ETAL     3,157,561
HARD SURFACE FLOOR COVERING AND METHOD OF MANUFACTURE
Filed Jan. 25, 1960
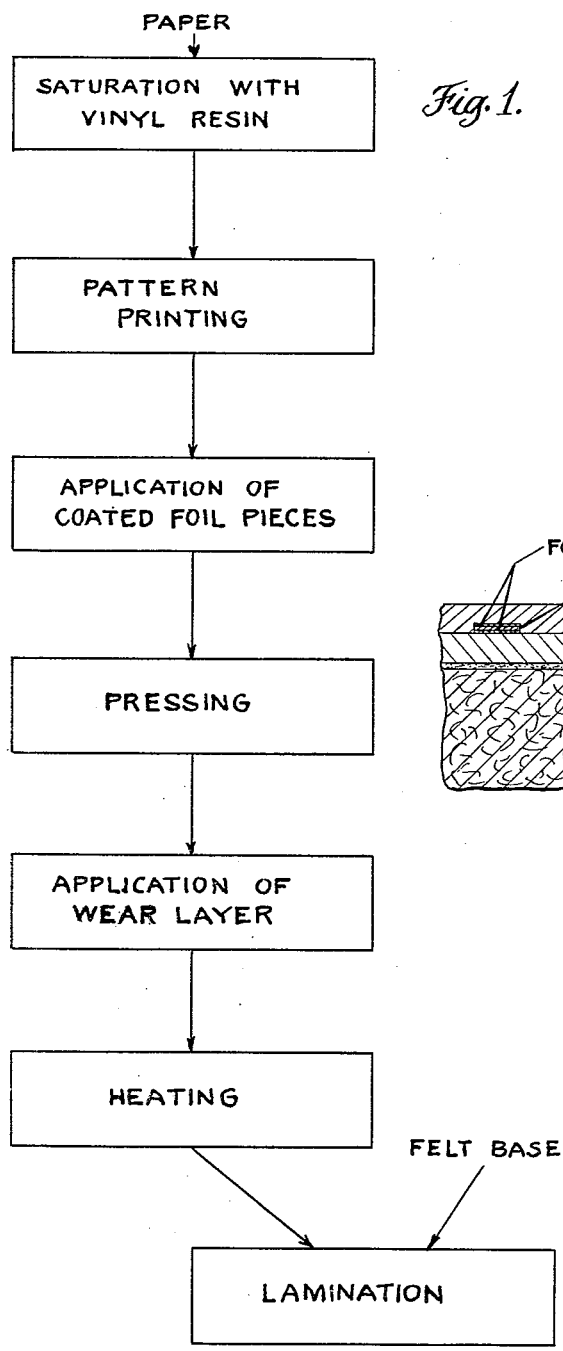
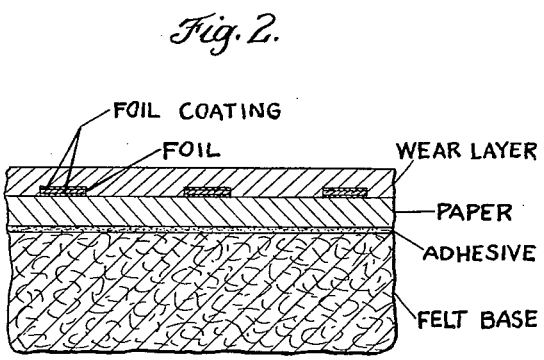
INVENTORS
John C. Miller
Edward R. Erb, Jr.
BY
Synnestvedt & Lechner
ATTORNEYS

United States Patent Office 3,157,561
Patented Nov. 17, 1964

3,157,561
HARD SURFACE FLOOR COVERING AND
METHOD OF MANUFACTURE
John C. Miller, Allentown, and Edward R. Erb, Jr., Geryville, Pa., assignors to Sandura Company, Jenkintown, Pa., a corporation of Delaware
Filed Jan. 25, 1960, Ser. No. 4,228
10 Claims. (Cl. 161—164)

This invention relates to hard surface floor covering and to a method for manufacturing such floor covering, and the invention is especially concerned with a multiple layer type of decorative hard surface floor covering.

While various features of the invention are applicable to floor covering materials of a variety of kinds falling within the field referred to above, the invention is particularly well adapted for use in multiple layer floor coverings incorporating vinyl resin materials in various of the layers thereof, an example of such floor covering being disclosed in Jones Patent 2,683,094, issued July 6, 1954. Because of its special applicability to floor coverings of the general class referred to in said Jones patent, the invention will hereinafter be illustratively described as used in a floor covering of the kind referred to in said Jones patent.

In considering some of the objects and advantages of the present invention, it is first pointed out that certain floor covering products have been produced incorporating, as a part of their decoration, metal foil pieces or chips, made for example from aluminum foil.

Use of such aluminum foil pieces for decoration in a multiple layer vinyl type of floor covering has presented certain problems, and broadly considered, the present invention has as an important object overcoming various problems which have presented themselves. For example, in general, the types of vinyl resin materials which are well adapted for use in floor coverings, do not have good adherence or adhesion with reference to metal foils and especially with reference to aluminum foil. Therefore, the incorporation of aluminum foil chips between vinyl layers or within such a layer, for instance in a transparent vinyl wear layer applied to a floor covering, results in a multiplicity of localized zones where, because of the poor adherence of the vinyl to the aluminum, the vinyl above the aluminum would tend to peel or scuff off, thus exposing the aluminum foil itself, which will then also readily be torn or worn away. The resultant pitted surface would be highly undesirable in a floor covering.

The invention has in view overcoming difficulties of the type mentioned above, and this is accomplished by employing aluminum chips or pieces carrying an adherent vinyl resin coating specially formulated so as to have good adherence to aluminum foil, while at the same time having the characteristic of being readily bonded to or fused with other vinyl resin materials which may be incorporated in the floor covering. While such specially formulated vinyl resin materials are characterized by the desired adherence with respect to aluminum, they are not well suited for use as a wear layer or for certain other purposes in vinyl type floor coverings, especially of the multiple layer type.

The invention therefore contemplates overcoming various prior difficulties by employing vinyl type resin materials of different composition for different purposes in the foil decorated type of vinyl floor covering.

The foregoing is explained more specifically by referring now to the application of the invention by way of illustration to the general type of floor covering disclosed in the Jones patent referred to above.

Briefly, a floor covering prepared according to said Jones patent comprises a paper sheet or web which, in an initial stage of the manufacture is saturated or impregnated with an aqueous dispersion of a vinyl resin, advantageously a vinyl chloride resin or a vinyl chloride-acetate copolymer. The use of an aqueous solution for this saturation step is of advantage because the paper sheet is most readily saturated or impregnated with the resin by that technique. After saturation, the sheet is dried to eliminate at least most of the moisture.

In a typical operation according to the Jones patent, the saturated web is passed through a printing machine, desirably of the gravure type and one or more colors of ink are applied according to the desired decoration pattern. In this printing operation, the ink is also preferably formulated of vinyl resins, for instance an ink containing as an important film forming constituent, a vinyl chloride-acetate copolymer. By employment of a printing ink of the vinyl type, good adherence of the printed decoration to the saturated sheet is provided.

After drying of the printed decoration, a transparent vinyl wear layer is applied to the decorated side of the sheet or web. This is advantageously accomplished by applying an organosol comprising a dispersion of a vinyl resin and a plasticizer in a volatile dispersion medium, for instance a dispersion of polyvinyl chloride. The employment of an organosol of this type for the purpose of building up the wear layer is particularly effective because of the desire to apply a coating of reasonable thickness, which is difficult to do with certain other types of coating techniques, for instance those employing a solution of the resin. The use of the vinyl resin in the transparent wear layer is again of advantage because it provides a high degree of adherence of this top layer to the printed decoration and to the saturated paper sheet.

After heating to remove solvent and fuse the wear layer with the remainder of the product, the decorated and coated paper sheet is laminated to a felt base, so as to make up a complete floor covering product.

Specific typical formulations for various of the solutions employed in preparing a product according to the above will be found in said Jones patent.

According to the present invention, certain modifications are made in the procedure outlined above in order to introduce into the decorative layer lying between the paper sheet and the top transparent wear layer, pieces, such as chips or filaments of aluminum foil. In a typical procedure according to the present invention, chips of aluminum foil prepared from aluminum foil sheets preferably coated on both sides with a vinyl resin are randomly distributed on top of the printed surface of the sheet or web after the printing inks have been dried. The sheet is then fed through pressure rolls at least of which is heated in order to flatten the chips and also to heat-fuse the coating on the chips with the printing ink and with the saturant in the paper sheet.

For this purpose of pressing and heating the chips on the sheet it is preferred to employ a pair of rolls, one of which is of metal and is surface coated with polytetrafluoroethylene, and the other of which is resilient, for instance rubber, the coated metal roll being arranged to contact the side of the sheet to which the foil chips are applied, and the resilient roll the opposite side. The use of the polytetrafluoroethylene coated roll minimizes pick-up of the foil chips on the roll.

After the passage of the sheet through the pressing and heating rolls, the transparent vinyl wear layer is applied and this in turn is heat-fused with the coating on the chips and with the printing ink and with the saturant of the paper sheet.

FIGURE 1 is a flow sheet diagram representing the above described steps in the process for making the product according to the present invention.

FIGURE 2 is a fragmentary sectional view through a product prepared according to the invention. In this view it is not intended that the thicknesses of the various layers in the product are precisely represented. The view, on the other hand, represents the various layers on a considerably enlarged scale, and without attempting to show the precise relationship between the thicknesses of the layers.

The specially formulated vinyl resin employed for coating the chips or other pieces of aluminum foil advantageously comprises a terpolymer of vinyl chloride and vinyl acetate, together with another organic radical contributing the adherence characteristic with reference to aluminum. It has been found that the terpolymer vinyl chloride-acetate-maleic anhydride is especially effective for this purpose. Such a resin is available on the market under the trade name Vinylite VMCH, made by Union Carbide Corporation. It will be understood that any similar vinyl compound having similar adherence characteristics with respect to aluminum may of course be used.

As hereinbefore mentioned, a vinyl resin material of the type characterized by good adherence to aluminum, is not well suited for use in at least most layers of the product. As an example of the reasons for this, it is noted that a material such as the terpolymer vinyl chloride-acetate-maleic anhydride is not a practicable resin to employ in aqueous dispersion or latex form, such as is desired to employ in the saturation of the paper sheet. Moreover, such a terpolymer is not readily useable in a dispersion of the kind which is suitable for building up a wear layer of reasonable thickness. The terpolymer, however, not only has good adherence to the aluminum foil, but, in addition, may readily be fused with the other types of vinyl materials which are employed in the other layers of the product.

The aluminum foil employed for the purposes herein contemplated is desirably foil of thickness ranging from 0.00045" to 0.0008". In a typical case the resin coating applied to each side of the foil may be of the order of 0.0001". While a layer of resin may be applied to aluminum foil in a number of different ways, it is preferred to prepare the aluminum foil by solution coating, for instance by using a solution of the resin in methyl ethyl ketone. This enables application of a thinner coating than is possible with certain other techniques, and in the floor covering itself it is preferred not to have the foil pieces of very great thickness, because such thick pieces would have a tendency to develop irregularities in the surface of the floor covering.

The aluminum foil pieces may be of a variety of shapes and sizes. Typical are small chips of the order of 1/16 of an inch square. Thin filaments of the order of about 1" in length and 1/64 of an inch wide represent another typical example. The pieces can be varied in size and shape within wide limits, according to the design or pattern effects desired.

It should further be kept in mind that the decoration with the aluminum foil pieces may be accomplished either with or without an underlying decorative printed pattern. For example, a decorative layer may be formed of pieces of one or more sizes or shapes randomly distributed over a solid color vinyl saturated or vinyl coated paper sheet, said solid color being either white, black, or some other color. Moreover, although use of a paper sheet as a foundation for the decoration is preferred, the resin coated foil pieces may be applied to a vinyl resin layer or film otherwise supported, or if desired, in unsupported form.

As other examples of pattern effects which may be obtained, the pieces of aluminum foil may be arranged according to predetermined patterns or pattern outlines, rather than randomly distributed, and pieces may be applied in this manner either on top of a printed pattern effect or on a sheet or layer of any solid color, which would then show up as a background for the pattern delineated by the distribution of the foil pieces themselves.

Variation in color of the foil chips may be achieved by employing pigments or dies in the resin coating for the chips. For example, chips or other pieces of gold appearance can readily be achieved by incorporating benzidine yellow in the resin coating for the chips.

While the illustrative embodiment of the invention described above with reference to the Jones patent, is a floor covering incorporating not only the decorated and wear-protected paper sheet but also a felt base, it will be understood that the invention is applicable to multiple layer covering materials of a variety of types. For instance, a paper sheet saturated and decorated according to the foregoing description, but without lamination to a felt base, may readily be employed for wall or counter covering. Various features of the invention may also be used in other specific types of multiple layer floor or wall covering materials.

We claim:
1. A multiple layer hard surface floor covering comprising as one layer a vinyl resin-saturated paper sheet, a decorative layer at one side of the paper sheet comprising pieces of aluminum foil, and a transparent vinyl resin wear layer superimposed on the decorated side of the sheet, said pieces of aluminum foil carrying an adherent layer of vinyl chloride-acetate-maleic anhydride copolymer and said adherent layer being fused with the saturant in the paper sheet and with the transparent wear layer.

2. A floor covering according to claim 1 in which the pieces of foil are randomly distributed in the decorative layer.

3. A floor covering according to claim 1 in which the decorative layer further comprises decorative color printing with a vinyl resin printing ink and in which the pieces of foil are superimposed on the decorative printing.

4. A floor covering according to claim 1 in which the pieces of foil are distributed in the decorative layer according to a pattern.

5. A multiple layer hard surface floor covering comprising as one layer a decorative layer comprising a vinyl resin and superimposed pieces of aluminum foil, and a transparent vinyl resin wear layer superimposed on the vinyl resin and foil pieces of the decorative layer, said pieces of aluminum foil carrying an adherent layer of vinyl chloride-acetate-maleic anhydride copolymer and said adherent layer being fused with the resin of the decorative and wear layers.

6. In the manufacture of hard surface floor covering, the method which comprises saturating a paper sheet with a dispersion of a vinyl resin, applying to the saturated paper sheet pieces of aluminum foil having an adherent coating of vinyl chloride-acetate-maleic anhydride copolymer, applying a transparent top wear coating of an organosol comprising a dispersion of a vinyl resin in a volatile organic dispersion medium, and heat fusing the coating of the foil pieces with saturant in the paper and with the transparent top coating.

7. A method according to claim 6 in which the coating of the foil pieces is heat fused with the saturant prior to application of the transparent top coating.

8. In the manufacture of multiple layer hard surface floor covering in which one layer is a decorative layer comprising a vinyl resin and another layer is a transparent wear layer comprising a vinyl resin, the method which comprises applying to the decorative layer pieces of aluminum foil having an adherent coating of vinyl chloride-acetate-maleic anhydride copolymer, applying the transparent wear layer onto the decorative layer and the applied pieces of coated foil, the wear layer being applied in the form of an organosol comprising a dispersion of a vinyl resin in a volatile organic dispersion medium, and heat fusing the coating of the foil pieces with the resins of the decorative and wear layers.

9. In the manufacture of multiple layer hard surface floor covering in which one layer is a decorative layer comprising a vinyl resin and another layer is a transparent wear layer comprising a vinyl resin, the method which comprises applying to the decorative layer pieces of aluminum foil having an adherent coating of vinyl chloride-acetate-maleic anhydride copolymer, pressing the foil pieces onto the decorative layer by means of a roll having a surface comprising polytetrafluoroethylene, applying the resin of the wear layer onto the decorative layer and the applied and pressed pieces of coated foil, and heat fusing the coating of the foil pieces with the resins of the decorative and wear layers.

10. In the manufacture of hard surface floor covering, the method which comprises saturating a paper sheet with an aqueous dispersion of a vinyl resin, drying the saturated sheet, applying to the sheet pieces of aluminum foil having an adherent coating of vinyl chloride-acetate-maleic anhydride copolymer, applying heat and pressure to the sheet to flatten the foil pieces and to fuse the coating thereof with the saturant in the sheet, applying a transparent top wear coating of an organosol comprising a dispersion of a vinyl resin in a volatile organic solvent, and heating the sheet to fuse the top coating with the coating on said pieces and with the saturant in the paper.

References Cited by the Examiner

UNITED STATES PATENTS

| 1,873,587 | 8/32 | Humphreys et al. | 154—25 |
| 2,329,456 | 9/43 | Campbell | 260—78.5 |
| 2,353,995 | 7/44 | Conner | 41—34 |
| 2,617,750 | 11/52 | Le Clair et al. | 154—49 X |
| 2,683,094 | 7/54 | Jones | 154—49 X |
| 2,685,511 | 8/54 | Nadeau et al. | 117—74 |
| 2,712,190 | 7/55 | Sobel | 41—10 |
| 2,785,993 | 3/57 | Paist et al. | 117—74 |
| 2,986,198 | 5/61 | Kolker et al. | 154—49 X |
| 2,987,102 | 6/61 | Heinrichs | 154—49 X |
| 3,049,459 | 8/62 | Smith et al. | 154—49 |

EARL M. BERGERT, *Primary Examiner.*

CARL F. KRAFFT, *Examiner.*